United States Patent Office 2,992,474
Patented July 18, 1961

2,992,474

MAGNETIC TAPE RECORDER HEADS

Edmond Adams, 713 Gist Ave., and William M. Hubbard, 10606 Lilac Place, both of Silver Spring, Md.

No Drawing. Filed Nov. 17, 1958, Ser. No. 774,159
16 Claims. (Cl. 29—182.5)

This invention relates to improvements in magnetic record transducing heads of the type which are used in magnetic recording systems for recording magnetic signals, or for reproducing magnetically-recorded signals, by magnetic flux interlinkage between relatively moving magnetic elements of a magnetic recording medium and windings of a magnetic transducer head which is used either for recording or for reproducing the signals, or for erasing signals on the recording medium. More particularly, the present invention pertains to a transducer head core of a magnetic alloy composed of a specific aluminum-iron-silicon composition produced under definite fabricating conditions and which is characterized by high magnetic and resistive properties and extreme physical hardness.

The use of magnetic oxide coated tapes in magnetic recording has pointed out the need for a head material of higher hardness to provide longer useful life for this critical component. Tape heads wear because of the abrasive action of the moving tape upon the surface of the head. The intimacy of the contact between tape and head at the gap surface determines the ultimate high frequency output from the head. For this reason pressure is generally applied to the tape to force it against the head gap, thereby insuring good contact and also increasing the wear. For video application this pressure is very high and the relative tape to head speed is large. These conditions are very severe as far as head wear is concerned.

Because of the physical design of the tape head, wear causes the gap width to continually increase. Since the width of the gap determines the ultimate high frequency response, this continual increase in gap width due to wear degrades the high frequency response of the head.

Another problem associated with tape recorder heads is the loss of applied signal due to eddy currents in the head material. These eddy currents are dependent upon the square of the frequency of the applied signal and the resistivity of the material comprising the head. In some cases involving high frequency erase, the eddy current losses are so great that, if ordinary head materials such as mu-metal or permalloy are used, not enough flux can be generated in the gap to erase the tape.

Moreover, due to prior art cores being of physically soft metal, the ends of the laminations forming the interfaces of the non-magnetic gap become frayed, or smeared over, during the construction of the core and are further constrained when a spacer is inserted in the gap. This constraining and fraying of the lamination ends causes virtually complete loss of high permeability at the gap interfaces, resulting in an electrical flux gap resolution that is approximately twice the physical gap dimension, thereby further decreasing the effective responsiveness thereof at high frequencies.

Another problem associated with the use of mu-metal or permalloy type materials in the manufacture of tape heads is the strain sensitive nature of these materials. The materials must be carefully heat treated and very carefully handled after heat treatment to avoid introducing strains which degrade the magnetic permeability to a great extent. This strain sensitivity therefore imposes severe restrictions upon the ease of manufacture of heads using these materials.

Several attempts have been made to solve these problems before. The most notable have been the use of magnetic ferrites and aluminum-iron alloys as head construction materials. The ferrites, being the same kind of material as is used on the tapes, have a hardness that is eminently suited for this application and in addition possess very high resistivities. The use of ferrites in tape recorder heads has never been very successful, however, because of the brittle nature of the material and its tendency to grow large grains during heat treatment. Because of its brittle nature the ferrites tend to chip, rather than wear away, at the gap edges thereby spoiling the resolving power of the gap. The large grains also interfere with high resolution because of the very careful lapping required to obtain a good gap fit. The aluminum-iron alloys, being metallic in nature, do not suffer from these shortcomings, but the magnetic permeability thereof is very much lower than in mu-metal, especially in thicknesses of less than .010. This low permeability limits the usefulness of this material in playback applications because of the inherent low sensitivity obtainable.

An ideal core material for magnetic record and reproduce heads, of the type in which the head is in direct contact with the recording medium, would be one which not only displays low eddy current losses but is also physically hard. It is necessary that the core material display low eddy current losses, particularly in erase units, if suitable electrical characteristics are to be obtained. As to displaying physical hardness, it is evident that by utilizing a physically hard material the head life, which is usually limited by the abrasive action of the recording medium, will be increased. That such a combination of low eddy current losses and physically hard material is unusual is evidenced by the fact that none of the recorder heads currently in use is characterized by both relative physical hardness and relative low eddy current losses.

Ternary iron-silicon-aluminum alloys are also known in the prior art as more fully described in the article "On a New Alloy 'Sendust' and its Magnetic and Electric Properties" by Hakar Masumoto, published on pages 388 through 402 of the 385th report of the Research Institute for Iron, Steel and other Metals. The magnetic material described in this article generally refers to cast ternary iron-silicon-aluminum alloys. Though the prior art cast ternary iron-silicon-aluminum alloys as described in this article exhibit good direction-current magnetic characteristics, the application thereof as castings is limited in actual use by reason of the extremely brittle nature thereof resulting from casting. Additional limitations on such cast prior art ternary alloy are imposed thereon by reason of the unworkability of the cast structure by conventional means such as machining, forging or the like. Consequently, laminate structures which are necessary, as is well known in the prior art in connection with alternating current use, cannot be obtained with such prior art cast ternary alloys.

It has also been already suggested in the prior art to apply conventional powder metallurgy techniques to sinter the powdered cast alloy into suitable shapes. However, all such prior attempts proved unsuccessful because of the difficulties in producing a sintered alloy containing aluminum and silicon with magnetic characteristics of equal quality as those of the original cast material. These difficulties are based on the inability of the prior art to diffuse the aluminum and silicon particles into homogeneous alloys containing iron and having sufficient density to be suitable as signal translating core structures.

The present invention aims at a magnetic core structure for use in signal tranlating devices which offers good magnetic as well as mechanical properties so as to permit use of such core structure in connection with magnetic cores for signal transducing devices, for example, magnetic transducer heads which require an extremely accurate finish, and contemplates the utilization of a transducer head core formed by a sintered aluminum-silicon-iron alloy which overcomes the aforementioned disadvantages of prior art core material and which approximates the aforedescribed ideal core material. In accordance with the present invention, the magnetic material utilized to form the core comprises a ternary alloy composed of a powder mix containing from 4% to 6.5% aluminum, from 8% to 11% silicon and the remainder essentially iron, in such proportions that the combined aluminum and silicon constitute preferably 15% of the mix and does not exceed 17% of the mix, which powder mix is then formed into a bulk by either compaction, rolling or casting and aftertreated by being subjected to a sintering operation.

With the foregoing in mind, it is an important object of the present invention to provide a transducer head core constructed of a magnetic material which is characterized by both low eddy current losses and physical hardness.

Another object is to provide a transducer core of such material as to be capable of having a non-magnetic gap therein which is characterized by an electrical gap resolution substantially equal to the physical gap dimension.

A further object is to provide a magnetic material for a transducer core which has a longer life-use than heretofore attained.

Yet another object is to provide a magnetic tape head that is insensitive to strain and is easy to manufacture.

A primary objective of the present invention is the provision of a magnetic head structure possessing high hardness and high resistivity in combination with a relatively high magnetic permeability and a small grain size.

The most significant object of the invention is to provide a magnetic tape head of such insignificant eddy current losses as to be negligible.

An important object of the invention is to provide, for a transducer core, an aluminum-silicon-iron alloy characterized by a hardness of the order of 70 to 75 Rockwell A and a specific electrical resistivity of 75 to 85 microohm centimeters.

Another important object of the invention is to provide a transducer core material comprised of an aluminum-silicon-iron alloy which has been worked into a desired shape and thereafter sintered by a heat treatment in a vacuum or inert atmosphere.

The exact nature of this invention, as well as other objects and advantages thereof, will be readily apparent from consideration of the following specification in which a generalized method of preparation of magnetic tape heads in accordance with the concept of the present invention is as follows:

A mixture of powders is prepared, using conventional mixing techniques, that contains from 4% to 6.5% aluminum, from 8% to 11% silicon and the remainder essentially iron, in such proportions that the combined aluminum and silicon content constitute preferably 15% of the powder mixture and no more than 17% thereof. Optionally, small amounts of well known additives such as antimony, beryllium, nickel, chromium, tungsten, molybdenum, magnesium, manganese, vanadium, tantalum, titanium, tin, zinc, boron, copper, phosphorous, arsenic, sulfur or zirconium may be added in accordance with conventional practice to modify the physical properties of the alloy, such as resistivity, hardness or permeability. In accordance with the practice of the present invention, the iron, aluminum and silicon are obtained from elemental iron powder, of —200 mesh or less, plus alloy powders, also of —200 mesh or less, containing sufficient iron, silicon and aluminum to yield the desired final composition. This mixture of powders is then formed into the final desired shape by compaction in a die, or by cutting from a sheet of the powder mixtures that have been formed by rolling the powder mixture, or by casting a suspension of the powders into sheet form. Alternatively, the desired final shape could be achieved after the powder mixtures had been partially or completely heat treated. In either event the powder mixture is heat treated in vacuum and/or an inert atmosphere, e.g., helium, at a high enough temperature, e.g., 1150° C., and a long enough time, e.g., 8 hours, to sinter the mixture and provide a structure having the desired physical and magnetic properties. The time and temperature used are interrelated and depend on the ultimate alloy composition and the composition of the raw materials used in the mix. For example, using a 15% Si-85% Fe master alloy and a 50% Al-50% Si master alloy in preparing the powder mixture, a suitable time and temperature might vary from 1100° C., for 16 hours to 1200° C. for 1 hour. This method of preparation can be further illustrated by the following examples, in which preferable percentage contents are specified, it being understood that the invention is not limited to these specified preferable percentages.

*Example I.*—A mixture of powders is prepared containing 85% iron, 9.6% silicon and 5.4% aluminum, by mixing 9.0% by weight of aluminum-silicon alloy powder (60% Al—40% Si) of —200 mesh size or finer with 40% by weight of ferro-silicon alloy powder (85% Fe—15% Si) of —200 mesh size or finer and 51% by weight of carbonyl type iron powder or any other type iron powder of —200 mesh size or finer. This powder mixture is then lightly compacted in a die to form a toroided structure of sufficient strength to permit cutting a radial slot. A non-magnetic spacer, such as beryllium-copper, of proper thickness and physical properties, is then inserted into the slot and the toroid repressed to bind the spacer firmly in the slot. This structure is then heat treated to provide an essentially solid mass by heating to 1175° C. for 8 hours in a helium atmosphere. Such treatment would provide a structure suitable for winding, without need for further treatment.

*Example II.*—A mixture of powders of the above composition is compacted in a die to yield one-half of a toroid. Two such structures are then heat treated as before. These structures are then ground and lapped so that they fit together to form a toroid with very small air gaps. A non-magnetic spacer is then inserted in one or both gaps to provide proper spacings and windings of wire are added to the structure to provide electrical pick-up. The entire assembly is then potted in resin to hold the two halves of the toroid together.

*Example III.*—A mixture of powders as before is suspended in water to which has been added a small amount of polyvinyl alcohol and ammonium alginate. The water content of the suspension is then adjusted to give a freely flowing suspension of the consistency of watery mud. This suspension is then flowed onto a flat surface to give a film of uniform thickness of the order of a few thousandths of an inch, the exact thickness being dependent upon the specific application. This film is then allowed to dry and harden at which time semi-circular segments are cut from these sheets. These segments are heat treated as before and glued together, one upon the other, to form two half-toroids which are then ground, lapped, and assembled as before.

*Example IV.*—A slurry is made as before of the metal powders. This slurry is then poured into molds to produce, upon drying, thin semi-circular segments as before. These segments are then heat treated and assembled as before into a finished head structure.

*Example V.*—90% by weight of pre-alloyed iron-aluminum-silicon alloy powder containing 9.6% Si, 5.4% Al, and 85% Fe is mixed with 10% by weight of the powder mixture described in Example I. This mixture is then compacted to yield one-half of a toroid. Two such structures are then heat treated at 1175° C. for 8 hours in a helium atmosphere. These structures are then ground and lapped so that they fit together to form a toroid with very small air gaps. A non-magnetic spacer is then inserted in one or both gaps to provide proper spacings and windings of wire are added to the structure to provide electrical pickup. The assembly is then potted in resin to hold the two halves of the toroid together.

This method of preparation is applicable to any composition desired but for magnetic tape head applications the most useful compositions contain from 4% to 6.5% aluminum, 8% to 11% silicon, and the remainder essentially iron. In connection with the foregoing examples and the general mode of fabrication hereinbefore described, it is to be noted that in each case the specified silicon and aluminum constituents are powder alloys and not elemental powders of silicon and aluminum. It is an essential and important feature of the present invention to use silicon and aluminum powder alloys inasmuch as the use of elemental silicon and aluminum powders in the aforedescribed mixtures results in a magnetic composition displaying poor magnetic properties and requiring extremely high compaction pressures to produce even a low density sintered compact.

Powders of FeSi alloy, AlSi alloy and Fe produce a sintered compact magnetically and physically superior to that obtained by using powders of elemental Fe, Al and Si. Although the reason for this is not exactly clear, it appears to be that elemental aluminum, when heated and fused, forms an oxide coating on its surface. Even if the heating process is carried out in an inert atmosphere, there is sufficient residual oxygen in the green compact to form this oxide coating which prevents the aluminum from wetting the solid iron and silicon. Consequently, liquid phase sintering does not take place and the rate of diffusion of the powdered components is slowed, thereby necessitating longer heating times and higher compacting pressures. However, when aluminum is present in the form of an AlSi alloy, the reaction is not inhibited by the formation of oxide on the surface of the molten AlSi alloy; and thus the liquid phase wets the iron rich powder, thereby permitting diffusion of the solid particles throughout the liquid phase. This results in a high density sintered compact which is more homogeneous and requires less severe sintering temperatures and compacting pressures.

The composition of the AlSi alloy could vary from 20% Al—80% Si to 89% Al—11% Si, depending on the desired final composition of the sintered compact. The melting point of the 20% Al alloy is 1300° C. which is the highest practical sintering temperature; whereas the melting point of the 89% Al alloy is 577° C., which is too low because sintering of the composition requires temperatures of 1000° C. to 1300° C. to achieve a fast reaction rate. A 55% Al—45% Si alloy melts at 1000° C., and forms a satisfactory liquid phase for sintering at this temperature; this alloy contains about the highest percent of aluminum that is practical for practicing this invention.

Although silicon may be added as elemental particles, it is preferable to add any silicon required in excess of the amount provided by the AlSi alloy as FeSi alloy. Since it is necessary for the Fe and Si to diffuse and intimately commingle, alloying the additional Fe and Si necessarily hastens the diffusion process.

It has been determined that adding the Al and Si as FeAl and FeSi produces a poor grade compact which requires extremely high compacting pressures. Additional aluminum may be added as elemental powder without detrimental effects provided that sufficient AlSi alloy is present to form the liquid phase. Elemental iron may be added, as necessity dictates, in order to obtain the desired final composition. From the foregoing, it is evident that the crux of the present invention resides in the utilization of FeSi and AlSi alloy powders in the fabrication of an Al-Si-Fe alloy of desired composition in accordance with the teaching of the present invention.

Table I represents, in addition to comparative properties, relative ratio of eddy current losses for comparable size transducer cores, fabricated from laminations of designated thickness, of Mo-Permalloy, 16–Alfenol and the alloy of the present invention. From Table I, it is noted that, using the eddy current losses of Mo-Permalloy as unity reference, the eddy current losses of Alfenol is 40% that of Mo-Permalloy; whereas the alloy core of this invention is only 20% that of Mo-Permalloy and half that of Alfenol.

Of utmost significance is the fact that although Alfenol has a higher resistivity than the core of the present invention and should accordingly have lower losses, an Alfenol transducer core actually has twice the eddy current losses of a comparable size core of the alloy of the present invention. Although it is not exactly understood why Alfenol, which has a higher resistivity than the core of the present invention, should have twice the eddy current losses, attention is directed to the fact that the comparative resistivities shown in Table I are for specimen-laminations and not for a fabricated core. Therefore, it appears that the resistivity properties of Alfenol laminations are deleteriously affected in the process of fabricating cores, whereas no such adverse effects are experienced by the alloy laminations of the present invention.

*Table I*

| Material | Resistivity in micro-ohm centimeters | $R_A$ hardness | Relative ratio of eddy current losses | Lamination thickness, inches |
|---|---|---|---|---|
| Mo-Permalloy | 57 | 26.5 | 1 | .010 |
| 16–Alfenol | 140 | 65.5 | 0.4 | .010 |
| Iron 85%, Al 5.4%, Si 9.6% | 80 | 70.6 | 0.2 | .027 |

It is also to be noted that the Fe-Al-Si alloy is characterized by a hardness greater than Alfenol or Mo-Permalloy, thereby ensuring longer head life than either Alfenol or Mo-Permalloy. In addition, the extreme hardness of Fe-Al-Si alloy of the present invention plays a major role in providing a core having an electrical gap resolution superior to either Alfenol or Mo-Permalloy. It is a known fact, during the lapping operation of the gaps of transducer cores, the lapped surface is severely cold worked and results in virtually complete loss of high permability in the material. Mo-Permalloy, because of its softness, has a tendency to smear, resulting in a deep penetration of the cold-work surface which causes loss of magnetic properties of the inner surface of the gap. Since Alfenol is not as hard as the Fe-Al-Si alloy, Alfenol also will have a gap resolution inferior to that of the Fe-Al-Si alloy.

From the foregoing, it is apparent that the invention provides the utilization of a core material having such insignificant eddy current losses as to be negligible.

It is also apparent that the invention provides a magnetic core that is physically harder than heretofore attained, thereby providing a core of prolonged life-use that has an electrical gap resolution approximating the physical gap resolution.

Obviously many modifications and variations of the present invention are possible in the light of the above teachings. It is therefore to be understood that, within the scope of the teachings herein and the appended claims, the invention may be practiced otherwise than as specifically described.

What is claimed and desired to be secured by Letters Patent of the United States is:

1. A core of magnetic material formed to define a substantially closed magnetic loop interrupted by a non-magnetic spacer, said core being comprised of a sintered ternary alloy having an aluminum content from 4% to 6.5%, a silicon content from 8% to 11% with the remainder essentially iron, said alloy being characterized by a physical hardness of 70 to 75 Rockwell A and an electrical resistivity of 75 to 85 micro-ohm-centimeters.

2. The core of claim 1 wherein the aluminum content is 5.4% and the silicon content is 9.6%.

3. A magnetic head assembly adapted to be used with a magnetic tape comprising magnetic core means having at least one set of mutually facing pole faces defining therebetween an air gap of relatively small dimension, essentially non-magnetic spacer means within said air gap, said core means being essentially composed of a sintered ternary alloy having an aluminum content of about 4 percent to 6.5 percent, a silicon content of about 8 percent to 11 percent with the remainder essentially iron, and coil means wound on said core means.

4. A magnetic head assembly adapted to be used with a magnetic tape comprising magnetic core means having at least one set of mutually facing pole faces defining therebetween an air gap of relatively small dimension, essentially non-magnetic spacer means within said air gap, said core means being essentially composed of a sintered ternary alloy having an aluminum content of about 4 percent to 6.5 percent, a silicon content of about 8 percent to 11 percent with the remainder essentially iron, the combined aluminum and silicon content constituting a maximum of about 17 percent of the mixture of the alloy, and coil means wound on said core means.

5. A magnetic core structure for translating signals between coil means wound on the core structure and a signal carrier medium traversing a pole face region thereof, said magnetic core structure being comprised of a sintered ternary alloy having an aluminum content of about 4 percent to 6.5 percent, a silicon content of about 8 percent to 11 percent with the remainder essentially iron.

6. A magnetic core comprised of a sintered ternary alloy having an aluminum content of about 4 percent to 6.5 percent, a silicon content of about 8% to 11% with the remainder essentially iron.

7. A magnetic core comprised of a sintered ternary alloy having an aluminum content of about 4% to 6.5%, a silicon content of about 8% to 11% with the remainder essentially iron, the combined aluminum and silicon content constituting a maximum of about 17% of the mixture of said alloy.

8. A magnetic head asembly comprising a core structure composed of two core structure portions providing effectively two relatively small air gaps between mutually facing pole faces, an essentially nonmagnetic spacer in one of said air gaps to maintain a predetermined small distance between one set of mutually facing pole faces, said core structure portions being charcterized by a physical hardness of at least 70 Rockwell A and comprised of a sintered ternary alloy having an aluminum content of about 4% to 6.5%, a silicon content of about 8% to 11% with the remainder essentially iron, coil means wound on said core structure, and means for retaining said core structure portions in place within said head assembly.

9. A magnetic head assembly comprising a core structure composed of two core structure portions providing effectively two relatively small air gaps between mutually facing pole faces, an essentially non-magnetic spacer in one of said air gaps to maintain a predetermined small distance between one set of mutually facing pole faces, said core structure portions being characterized by a physical hardness of at least 70 Rockwell A and comprised of a sintered ternary alloy having an aluminum content of about 4% to 6.5%, a silicon content of about 8% to 11% with the remainder essentially iron, the combined aluminum silicon content constituting a maximum of about 17% of the mixture of said alloy, coil means wound on said core structure, and means for retaining said core structure portions in place within said head assembly.

10. A magnetic head assembly comprising a core structure composed of two core structure portions, each consisting of a plurality of stacked relatively thin laminations and providing effectively two relatively small air gaps between mutually facing pole faces, an essentially nonmagnetic spacer in one of said air gaps to maintain a predetermined small distance between one set of mutually facing pole faces, said core structure portions being characterized by a physical hardness of at least 70 Rockwell A and comprised of a sintered ternary alloy having an aluminium content of about 4% to 6.5%, a silicon content of about 8% to 11% with the remainder essentially iron, coil means wound on said core structure, and means for retaining said core structure portions in place within said head assembly.

11. A magnetic head assembly comprising a core structure composed of two core structure portions each consisting of a plurality of stacked relatively thin laminations and providing effectively two relatively small air gaps between mutually facing pole faces, an essentially non-magnetic spacer in one of said air gaps to maintain a predetermined small distance between one set of mutually facing pole faces, said core structure portions being characterized by a physical hardness of at least 70 Rockwell A and comprised of a sintered ternary alloy having an aluminum content of about 4% to 6.5%, a silicon content of about 8% to 11% with the remainder essentially iron, the combined aluminum silicon content constituting a maximum of about 17% of the mixture of said alloy, coil means wound on said core structure, and means for retaining said core structure portions in place within said head assembly.

12. A magnetic core structure composed of several core structure portions, said core structure portions being essentially composed of a sintered ternary alloy having an aluminum content of about 4% to 6.5%, a silicon content of about 8% to 11% with the remainder essentially iron, said alloy being characterized by a physical hardness at least of about 70 Rockwell A and by a resistivity at least of the order of 75 micro-ohm-centimeters.

13. A magnetic core structure for use with a relatively movable part characterized by a physical hardness at least of the order of 70 Rockwell A and a resistivity at least of the order of 75 micro-ohm-centimeters, said core structure being comprised of a sintered ternary alloy having an aluminum content of about 4% to 6.5%, a silicon content of about 8% to 11% with the remainder essentially iron, and the combined aluminum and silicon content constituting a miximum of about 17% of the alloy mixture.

14. A magnetic head assembly, comprising a substantially toroidal core structure including two core structure portions effectively providing a relatively small air gap, a non-magnetic spacer in said air gap, said core structure portions being comprised of a sintered ternary alloy having an aluminum content of about 4% to 6.5%, a silicon content of about 8% to 11% with the remainder essentially iron, coil means wound on said core structure, and means for retaining said core structure portions together in the assembled condition thereof.

15. A magnetic head assembly, comprising a core structure including two core structure portions effectively providing a relatively small air gap, a non-magnetic spacer in said air gap, said core structure portions being comprised of a sintered ternary alloy having an aluminum content of about 4% to 6.5%, a silicon content of about 8% to 11% with the remainder essentially iron, coil means wound on said core structure, and means for retaining said core structure portions together in the assembled condition thereof including a resin potting encompassing said assembly.

16. A magnetic core structure essentially composed of a plurality of stacked laminations comprised of a sintered ternary alloy having an aluminum content of about 4% to 6.5%, a silicon content of about 8% to 11% with the remainder essentially iron, said ternary alloy being characterized by a physical hardness at least of the order of 70 Rockwell A and by a resistivity at least of the order of 75 micro-ohm-centimeters.

References Cited in the file of this patent

UNITED STATES PATENTS 2,864,734 Adams et al. ---------- Dec. 16, 1958

OTHER REFERENCES

Bozorth: "Ferromagnetism," publ. 1951, pp. 95, 97, 99.